US012623172B2

(12) United States Patent
Heinz et al.

(10) Patent No.: US 12,623,172 B2
(45) Date of Patent: May 12, 2026

(54) LIQUID SEPARATOR

(71) Applicant: Joma-Polytec GmbH, Bodelshausen (DE)

(72) Inventors: Stefan Heinz, Bodelshausen (DE); Isabelle Kümmerle, Hechingen (DE); Sven Bulach, Hechingen (DE); Oliver Vollmer, Rottenburg (DE); Simon Kümmerle, Mössingen (DE)

(73) Assignee: Joma-Polytec GmbH, Bodelshausen (DE)

( * ) Notice: Subject to any disclaimer, the term of this patent is extended or adjusted under 35 U.S.C. 154(b) by 334 days.

(21) Appl. No.: 18/229,847

(22) Filed: Aug. 3, 2023

(65) Prior Publication Data

US 2024/0042359 A1    Feb. 8, 2024

(30) Foreign Application Priority Data

Aug. 3, 2022    (DE) ..................... 10 2022 119 462.0

(51) Int. Cl.
B01D 45/04        (2006.01)
B01D 46/00        (2022.01)
(Continued)

(52) U.S. Cl.
CPC ......... B01D 45/04 (2013.01); B01D 46/0041 (2013.01); B01D 50/20 (2022.01); *H01M 8/04164* (2013.01)

(58) Field of Classification Search
CPC .... B01D 45/04; B01D 46/0041; B01D 50/20; B01D 46/0031; B01D 53/26; B01D 45/08; H01M 8/04164
See application file for complete search history.

(56) References Cited

U.S. PATENT DOCUMENTS 6,770,121 B1 *    8/2004    Sindel ................... B01D 45/08
                                                    55/440
2008/0257161 A1 *  10/2008   Read ...................... B01D 50/20
                                                    29/428
(Continued)

FOREIGN PATENT DOCUMENTS

DE      20 2006 020 426 U1    9/2008
DE        102014013372 A1    3/2016
(Continued)

OTHER PUBLICATIONS

Translation of EP2489801A1 (Year: 2012).*
German Search report for application No. 10 2022 119 462.0 dated Apr. 25, 2023 with Google Translate English translation.

*Primary Examiner* — Jennifer Dieterle
*Assistant Examiner* — Phillip Y Shao
(74) *Attorney, Agent, or Firm* — Carter, DeLuca & Farrell, LLP

(57)        ABSTRACT

A liquid separator (10) for separating liquid from a gas-liquid mixture has a housing (12), an inlet (14), an outlet (16), a flow path (18) connecting the inlet (14) to the outlet (16), and a separation device (20), arranged in the flow path (18), for liquid separation, wherein a diverting element (22) is arranged adjacent to the separation device (20). Said diverting element separates an inlet region (24) of the housing (12), into which the inlet (14) opens, and an outlet region (26) of the housing (12), from which the outlet (16) opens, from one another, wherein the flow path (18) extends from the inlet region (24) via a low-flow region (46) into the outlet region (26).

11 Claims, 7 Drawing Sheets

(51) Int. Cl.
    *B01D 50/20*         (2022.01)
    *H01M 8/04119*      (2016.01)

(56)              References Cited

U.S. PATENT DOCUMENTS

| | | | |
|---|---|---|---|
| 2010/0282694 A1* | 11/2010 | Menchaca Lobato | B01D 45/08 |
| | | | 210/802 |
| 2012/0260616 A1* | 10/2012 | Leister | B01D 46/10 |
| | | | 55/502 |
| 2016/0375389 A1* | 12/2016 | Steiner | B01D 45/08 |
| | | | 95/268 |
| 2018/0236388 A1* | 8/2018 | Harris | B01D 29/23 |
| 2018/0272264 A1* | 9/2018 | Ming | B01D 50/20 |
| 2022/0347613 A1* | 11/2022 | Heinz | B01D 46/4263 |
| 2023/0330564 A1* | 10/2023 | An | B01D 19/0052 |

FOREIGN PATENT DOCUMENTS

| | | | |
|---|---|---|---|
| DE | 10 2021 123 966 A1 | 3/2023 | |
| EP | 2489801 A1 | 8/2012 | |
| EP | 4043084 A1 | 8/2022 | |
| WO | 2021083486 A1 | 5/2021 | |

* cited by examiner

LIQUID SEPARATOR

FIELD

This disclosure relates to a liquid separator for separating liquid from a gas-liquid mixture.

BACKGROUND

Liquid separators are known from the prior art. These can operate according to different functional principles—for example, via condensation, centrifugal force (cyclone), sorption (use of a sorbent), or via baffles.

Liquid separators can be used, for example, in fuel cells, where, to increase efficiency, on the cathode side, water is separated from oxygen ($O_2$) using a liquid separator, and, on the anode side, water is separated from hydrogen ($H_2$) using a (further) liquid separator. Liquid separators can also be used in compressed air systems or air conditioning systems.

DE 10 2014 013 372 A1 shows a centrifugal water separator for a fuel-cell system, in which a gas-liquid mixture is introduced tangentially into the separator via an inlet line, wherein liquid collects by centrifugal force influences on the inner wall of the separator and flows downwards through a drain, wherein the gas (possibly residual moisture) is discharged upwards via an outlet line. This separator has a low pressure differential, but is capped with respect to the separation efficiency, since a high proportion of residual moisture can be "entrained" by the outlet line.

WO 2021/083486 A1 discloses a liquid separator in which a gas-liquid mixture is introduced into the separator through an inlet, passes through a baffle separator equipped with several fabric sections, and is discharged via an outlet. This separator allows high separation efficiencies to be achieved with a compact design. Depending upon the liquid content in the gas-liquid mixture, increased pressure differentials may possibly occur.

SUMMARY

The object underlying this disclosure is that of facilitating reliable separation of liquids using simple constructive means and a compact design. It is desirable for high separation efficiencies to be able to be achieved at comparatively low pressure differentials.

This disclosure achieves this object by means of a liquid separator having the features of claim 1.

The liquid separator serves to separate liquid from a (flowing), and in particular vaporous or mist-like, gas-liquid mixture (liquid-loaded gas stream).

The gas-liquid mixture is in particular a mixture in which gas serves as a carrier medium, and liquid is present in the form of finely-dispersed liquid drops.

The liquid separator has a housing, an inlet into the housing (gas-liquid mixture inlet), an outlet from the housing (gas outlet), and a flow path that connects the inlet to the outlet (flow connection). Arranged in the flow path is a separation device, in which the actual separation of the liquid from the gas-liquid mixture takes place. The separated liquid can be a pure liquid or a liquid mixture (mixture of two or more different liquids).

The liquid separator is characterized in that a diverting element for diverting the flow path is arranged adjacent to the separation device, said diverting element separating an inlet region of the housing, into which the inlet opens, and an outlet region of the housing, from which the outlet opens out (diverting element serves as a kind of barrier or partition wall). In this case, the flow path passes through a low-flow region on the way from the inlet region into the outlet region. In other words, the flow path extends from the inlet or from the inlet region via a low-flow region into the outlet region or the outlet.

It has been recognized that a high liquid separation efficiency can be achieved at comparatively low pressure differentials when the flow path or the gas-liquid mixture moving along the flow path is diverted in such a way that the flow rate of the gas-liquid mixture is reduced, and thus liquid drops in the liquid separator pass downwards due to gravity—for example, into a corresponding collecting region. The reduced flow rate also leads to separated liquid droplets not being entrained again by the gas flow.

The diverting element blocks the direct path (shortest connection) between inlet and outlet, so to speak. The diverting element can be designed as a partition wall. A hermetically-sealed separation of inlet region and outlet region by the diverting element is not absolutely necessary, but optionally possible. The separation of these regions by the diverting element must be at least "flow conducting," i.e., must therefore predefine the flow direction of the gas-liquid mixture. This means that the flow path or the gas-liquid mixture moving along the flow path is forced to take a "detour" through the low-flow region. In other words, the diverting element is designed, e.g., by being embodied as a partition wall, such that the gas-liquid mixture cannot flow through the diverting element. Instead, the gas-liquid mixture must take the "detour" through the low-flow region. The flow rate in the liquid separator is at its lowest in the low-flow region.

The inlet region and the outlet region are arranged directly next to one another and are separated from one another only by the diverting element. The inlet may extend along an inlet axis, and the outlet may extend along an outlet axis. The inlet axis and the outlet axis can enclose an angle between them—for example, an angle of 90°.

The housing of the liquid separator delimits an interior of the liquid separator to the outside. The components of the liquid separator can be arranged in the housing. The housing of the liquid separator can be formed in one piece or in multiple parts. The housing can be made of plastic.

The inlet of the liquid separator can open directly into the separation device. The inlet region of the liquid separator can extend from this mouth to the free end, extending in the direction of the low-flow region, of the diverting element. The separation device is preferably arranged completely in the inlet region.

The outlet region can extend from the free end of the diverting element to the mouth of the outlet from the outlet region.

The low-flow region is configured such that the flow rate along the flow path or the flow rate of the gas-liquid mixture moving along the flow path is reduced or comparatively low—preferably at least in the liquid separator. The open cross-section of the housing of the liquid separator can be greatest in the low-flow region, and preferably transverse to the direction of gravity or transverse to a vertical axis of the housing. The low-flow region can be positioned along the direction of gravity or along the vertical axis of the housing below the inlet region and the outlet region, and, optionally, directly abut against said regions. The low-flow region can be arranged centrally in the liquid separator or the housing thereof (central region).

In the context of a preferred embodiment, the diverting element can extend flatly (i.e., along a plane) and have a central longitudinal plane, wherein the separation device has a central longitudinal axis (central axis), and wherein the central longitudinal axis of the separation device and the central longitudinal plane of the diverting element intersect at an angle of less than 90°, and in particular at an angle of 30°-60°. The angle specification refers to the smaller or smallest angle that the central longitudinal axis and the central longitudinal plane enclose between them. The central longitudinal axis of the separation device can correspond to a main flow direction in the separation device. The central longitudinal axis of the separation device and a central longitudinal axis of the inlet can be oriented to be parallel or congruent to one another.

The diverting element can advantageously be fastened to the housing in particular via a mechanical plug connection. This contributes to a structurally simple and robust coupling of the diverting element and the housing. In addition, the housing or housing parts and the diverting element can be manufactured separately. A receiving section with a groove can be arranged on the housing or in the interior of the housing, wherein the diverting element can be inserted (partially or with a subsection) into the groove. The plug connection can be designed as a "groove and tongue" connection.

Alternatively, it is conceivable that the diverting element be integrally connected to the housing or a housing part—for example, an upper housing part (integrated diverting element). This reduces the number of individual components and thus facilitates assembly of the liquid separator.

Expediently, the separation device, at its end facing away from the inlet, can have a fastening portion, wherein the diverting element has a holding portion which corresponds to and holds the fastening portion. This contributes to a simple coupling of the diverting element and separation device, and stabilizes these components against one another. The fastening portion of the separation device can be connected to a housing of the separation device or be part of the housing of the separation device.

In the context of a preferred embodiment, in the interior of the housing, a ring- or collar-like, self-contained insert element can be arranged, which projects into the inlet region and, together with a wall of the housing, defines a flow channel which connects the inlet region to the low-flow region arranged above a collecting region, so that liquid collected in the inlet region can flow through the flow channel into the collecting region. This favors a high separation efficiency, since liquid collected in the inlet region, e.g., on wall surfaces, can flow securely through the flow channel ("shadow channel") between the insert element and the housing wall of the liquid separator through the low-flow region into the collecting region. The entrainment of collected liquid can thus be largely avoided. The flow channel can be designed as a gap extending around the insert element (circumferential gap between the insert element and the housing wall).

Specifically, several ribs that are spaced apart for distancing the insert element from the wall can be configured on several or on all sides of the insert element which face the wall of the housing (outer sides of the insert element). This ensures a certain minimum cross-section of the flow channel or gap. The ribs can be formed on several or on all of the outer sides of the insert element. The ribs can each be formed continuously ("continuous or solid rib") or discontinuously ("discontinuous rib").

In an advantageous manner, on a side, facing away from the inlet region, of the insert element ("opposite side") and/or on the sides of the insert element which extend to the inlet region from the side facing away from the inlet region (side surfaces), several slots extending along a longitudinal direction of the slot can be configured in each case, the cross-section of said slots extending in each case to the wall of the housing (i.e., towards the outside). The slots can each have a V-shaped cross-section. As a result, liquid which impinges on the opposite side or on the side surfaces, e.g., in droplet form, can pass through the slots into the flow channel or the gap ("shadow channel"). This avoids an "entrainment" of collected liquid to the outlet, so that separation efficiency can be increased. The longitudinal direction of the slot (on the opposite side) can extend in particular along the transverse direction of the insert element. The (further) longitudinal direction of the slot on the side surfaces extends, for example, orthogonally to the longitudinal direction of the slot of the opposite side.

Expediently, the insert element can extend with a portion into the outlet region of the housing. This promotes high separation efficiency, since collected liquid can be discharged through the flow channel or the gap into the collecting region.

Advantageously, the diverting element can extend with a portion of its free end into the interior (open cross-section) of the insert element. This ensures that the flow path or the gas-liquid mixture moving along the flow path is diverted at least largely into the interior of the insert element. As a result, liquid can be collected and discharged—for example, by passing liquid through the slots into the flow channel or gap and by secure flow off in the flow channel or gap.

Specifically, the separation device can be configured as a fabric separator with at least one fabric section for liquid separation. This contributes to a high liquid separation efficiency. The fabric separator can act as an atomizer, can thus distribute and/or divert the liquid gas flow in different directions, for example.

Preferably, the separation device can have two fabric sections which are arranged symmetrically, relative to the central longitudinal axis, in the separation device, wherein the fabric sections together enclose an angle of 2° to 30°. In this way, a comparatively large separating surface can be created with a compact design. Any pressure differentials arising can be kept low. In addition, the flowing gas-liquid mixture can be diverted so that liquid, e.g., in droplet form, impinges upon wall surfaces facing the fabric sections. A separation can be achieved there, for example by flow off of the liquid through the flow channel or gap into a collecting region.

In the context of a preferred embodiment, a liquid reservoir and/or a fill-level sensor can be arranged in the collecting region of the housing. With the liquid reservoir, an internal liquid collecting region (tank) is present in which collected liquid can be stored. The liquid fill-level in the liquid collecting region can be determined by means of the fill-level sensor. It is thus apparent when the liquid collecting region is full, and liquid has to be drained off. The fill-level sensor can have a preferably perforated metal cap as a protective element. The fill-level sensor can be made of stainless steel.

As an alternative to the fill-level sensor, the liquid separator can have a controller which is configured such that an intermittent emptying of the liquid reservoir takes place—for example, by corresponding (intermittent) valve opening of a discharge valve provided at the liquid outlet.

In an expedient manner, a cover sleeve can be provided, by means of which the fill-level sensor, starting from its free end (facing the low-flow region), is covered over its predominant free length. The cover sleeve can additionally protect the fill-level sensor. In addition, the accuracy of the fill-level sensor can be increased, since the effect of "sloshing movements" (for example, due to accelerations acting upon the liquid separator) on the fill-level sensor is reduced.

In the context of a preferred embodiment, one or more surge elements can extend in the collecting region of the housing of the liquid separator. The surge elements can be designed as plate-like elements extending along a plane, for example. The surge elements can reduce "sloshing movements" of liquid in the collecting region and thus reduce the risk that liquid sloshes into the low-flow region or the outlet region. In addition, the accuracy of the fill-level sensor can be increased. The surge elements can optionally be connected to the cover sleeve of the fill-level sensor. The surge elements can be made of plastic or metal.

A liquid outlet having a controllable discharge valve can be configured on the housing in the collecting region. In this way, a targeted drainage of liquid is possible. The liquid outlet can be arranged along the direction of gravity at the lowest point of the collecting region.

The liquid separator can have an electrically-operating heating element, by means of which the collecting region can be heated. As a result, the temperature of the collecting region and/or of liquid contained therein can be controlled. The freezing of liquid can thus be avoided.

The heating element can be designed as a heating lance ("stand-alone" embodiment). Alternatively, the heating element together with the fill-level sensor can be configured as a unit or assembly. The heating element can be attached to the fill-level sensor such that the collecting region can be heated via the fill-level sensor.

The liquid separator can have an outlet valve and/or a flush valve, which is in each case fluidically connected to the outlet. The fluid, e.g., water, can be drained periodically or as a function of the fill-level via the outlet valve. By means of the flush valve, gas mixture is periodically blown out of the circuit, into which the liquid separator can be integrated, in order to reduce the nitrogen concentrating in the hydrogen circuit, as in fuel cells for example.

The housing can have a first housing part and a second housing part which abut against one another at a separating plane. The inlet and/or the outlet can be arranged on the first housing part. The low-flow region and/or the collecting region can be arranged in the second housing part. The first housing part can form a cover, and/or the second housing part can form a lower housing part or a main housing part.

BRIEF DESCRIPTION OF THE DRAWINGS

This disclosure is explained in more detail below with reference to the figures, wherein identical or functionally identical elements are provided with identical reference signs, but, where applicable, only once. In the drawings.

DETAILED DESCRIPTION

Figure 1:
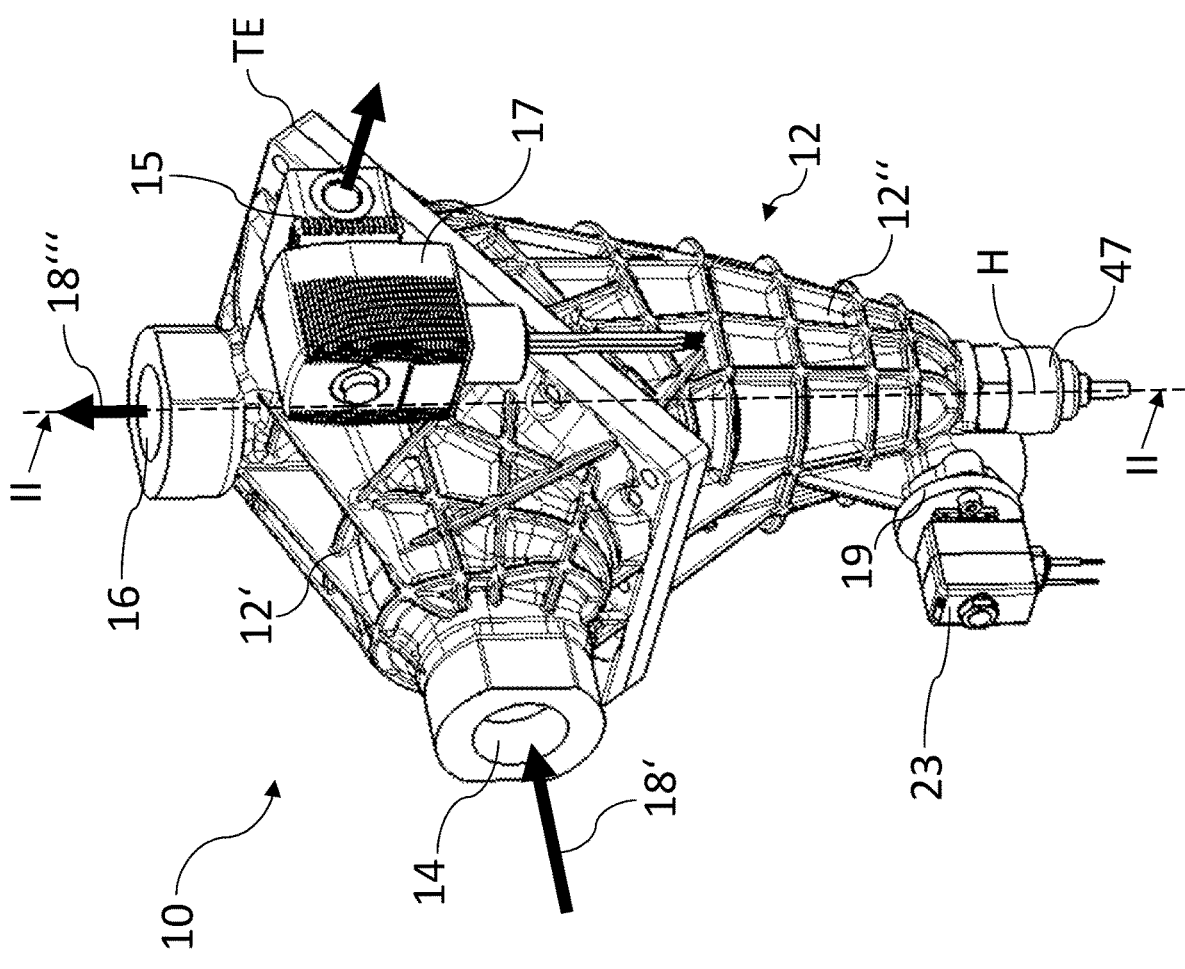
FIG. 1 shows an embodiment of a liquid separator in a perspectival view.

FIG. 1 shows a liquid separator for separating liquid from a gas-liquid mixture, which is denoted as a whole by the reference sign 10.

The liquid separator 10 has a housing 12 which extends along a vertical axis H of the housing. The housing 12 can be made of plastic. In the example, the housing 12 has a first housing part 12' and a second housing part 12", which abut against one another at a separating plane TE. In principle, embodiments having more than two housing parts and a differently oriented separating plane are also conceivable.

The liquid separator 10 has an inlet 14, an outlet 16, and a flow path 18 connecting the inlet 14 to the outlet 16 (ref. signs 18', 18", 18'''). The liquid separator 10 can be flowed through by a gas-liquid mixture moving along the flow path 18 (liquid-loaded gas flow). When passing through the liquid separator 10 along the flow path 18, the gas-liquid mixture can be dehumidified, i.e., liquid can be separated from the gas-liquid mixture. In the example, the inlet 14 and the outlet 16 together enclose an angle of 90° (not shown for reasons of clarity).

In the example, the liquid separator 10 has an outlet valve 15 and a flush valve 17, each of which is fluidically connected to the outlet 16, as explained above. In addition, in the example, the liquid separator 10 has a liquid outlet 19 with a controllable discharge valve 23 in order to discharge collected liquid from a collecting region 44 (cf. FIGS. 1 and 2). In addition, the liquid separator 10 has a fill-level sensor 47, by means of which a liquid fill-level in the collecting region 44 can be determined.

FIGS. 2 through 5 show the internal structure of the liquid separator 10.

The interior of the liquid separator 10 has an inlet region 24, an outlet region 26, the collecting region 44, and, above this, a low-flow region 46. In its interior, the liquid separator 10 also has a separation device 20, a diverting element 22, and an insert element 40 (cf. FIG. 2).

The separation device 20 is arranged in the flow path 18, and the actual liquid separation takes place thereon. The inlet 14 opens into the inlet region 24 of the housing 12, and, specifically, directly into the separation device 20. The diverting element 22, in the sense of a partition wall, separates the inlet region 24 and the outlet region 26, from which the outlet 16 opens out. The flow path 18 or the liquid-gas mixture flowing along the flow path 18 passes through the low-flow region 46 on the way from the inlet region 24 into the outlet region 26, since the liquid-gas mixture cannot flow through the diverting element 22 or the partition wall and is thus forced to take the "detour" via the low-flow region.

The diverting element 22 extends flatly and has a central longitudinal plane 28, wherein the separation device 22 has a central longitudinal axis 30, and wherein the central longitudinal axis 30 of the separation device 20 and the central longitudinal plane 28 of the diverting element 22 intersect at an angle of less than 90°—here, in the example, at approximately 50°, as explained above. In the example, the diverting element 22 is fastened to the housing 12 via a mechanical plug connection 32, as explained above.

Figure 2:
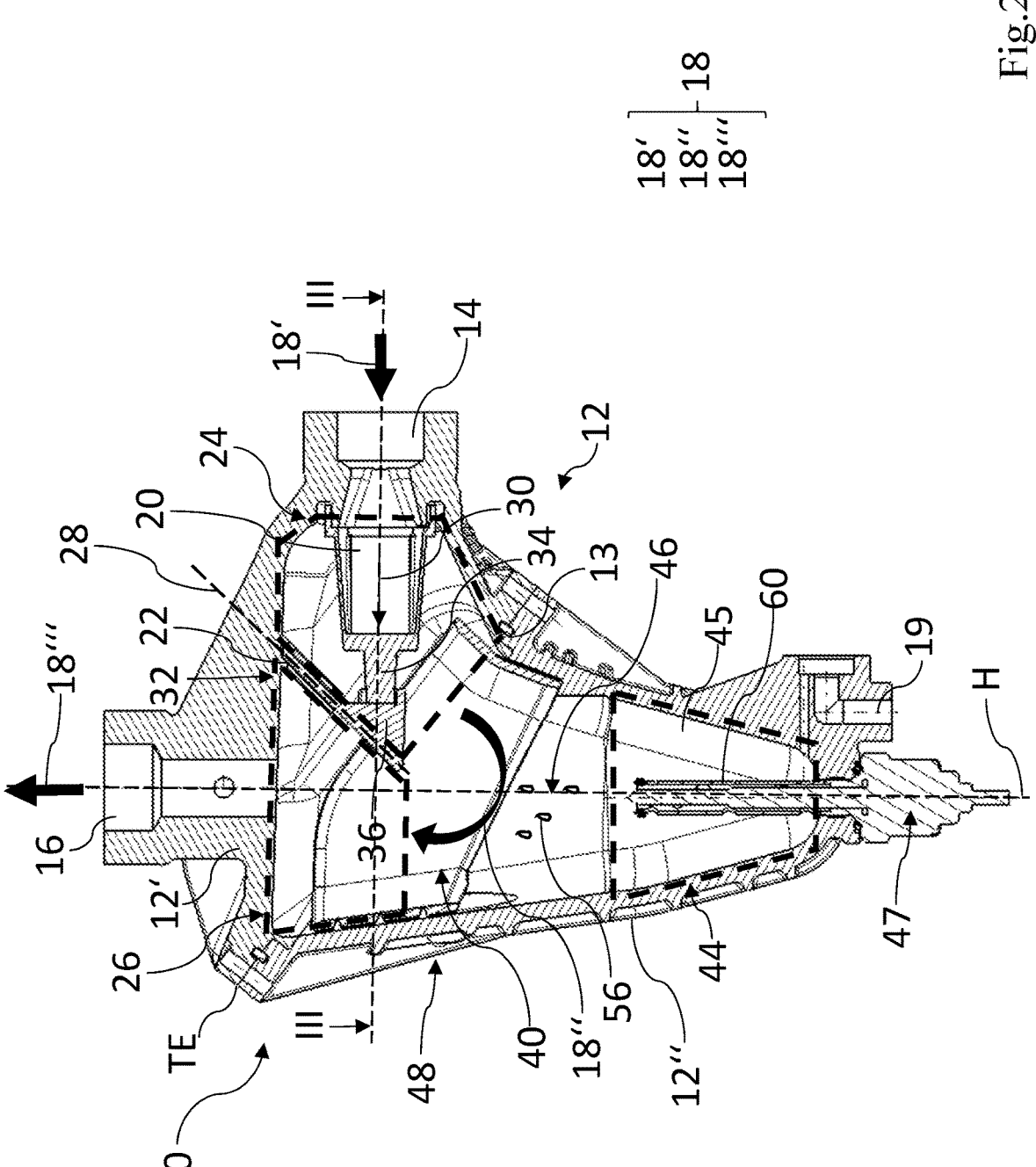
FIG. 2 shows a section through the liquid separator from FIG. 1 along the intersecting axis II-II in FIG. 1.
Figure 3:
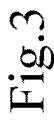
FIG. 3 shows a section through the liquid separator from FIG. 2 along the intersecting axis in FIG. 2.
Figure 4:
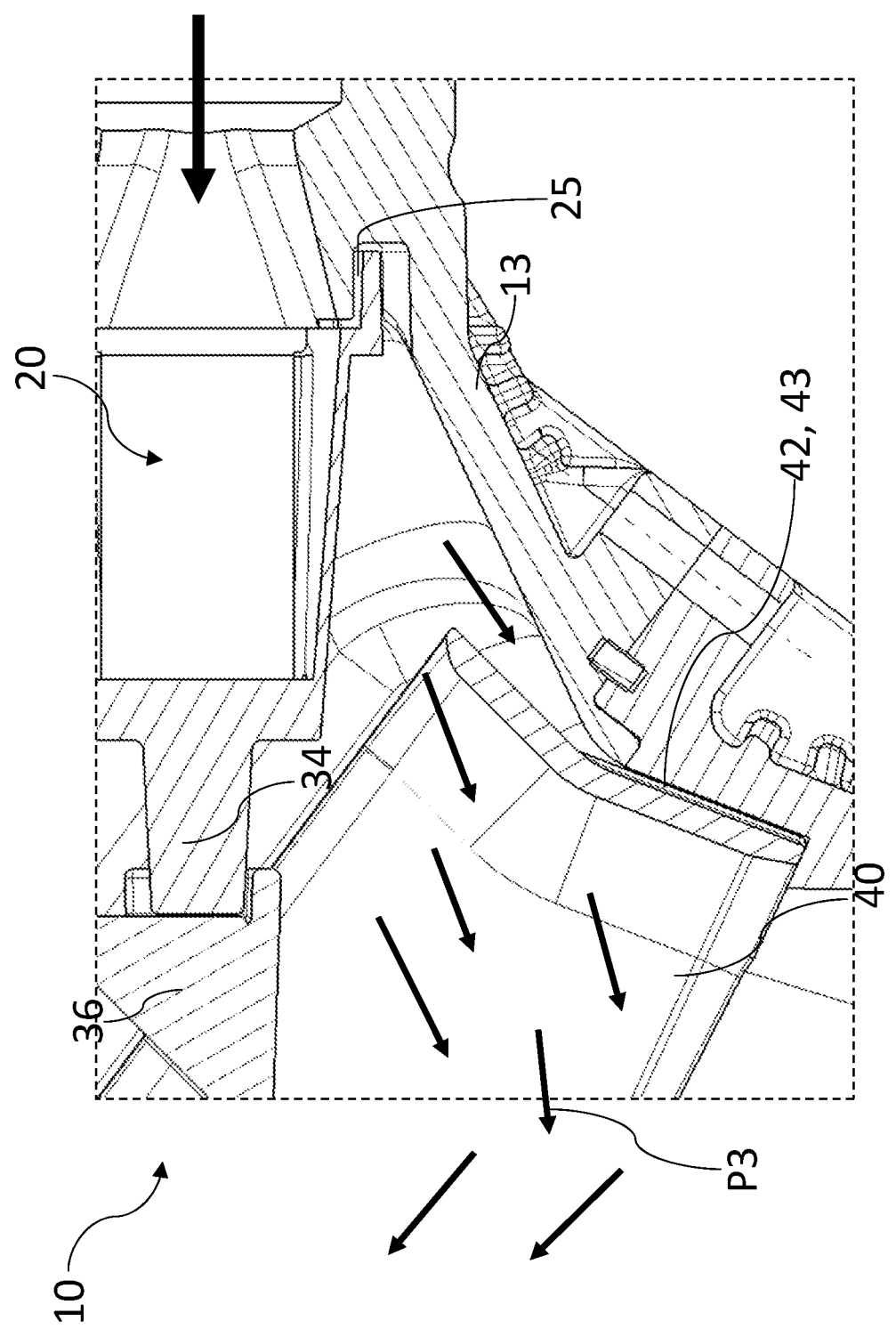
FIG. 4 shows an enlarged partial detail of the liquid separator from FIG. 2.

The separation device 20 has, at its end facing away from the inlet 14, a fastening portion 34, wherein the diverting element 22 has a holding portion 36 which corresponds to and holds the fastening portion 34 (cf. FIGS. 2 through 4).

The collar-like, self-contained insert element 40 is arranged in the interior of the housing 12. The insert element 40 projects into the inlet region 24 and, together with a wall 13 of the housing 12, defines a flow channel 42 which connects the inlet region 24 to the low-flow region 46 arranged above the collecting region 44, so that liquid collected in the inlet region 24 can flow through the flow channel 42 ("shadow channel") into the collecting region 44 (cf. FIGS. 3 and 4). In the example, the flow channel 42 is designed as a gap 43 extending around the insert element 40 (circumferential gap 43 between the insert element 40 and the housing wall 13).

In the example, multiple and spaced ribs 41 are formed on each side of the insert element 40 facing the wall 13 of the housing 12 to space the insert element 40 from the wall 13.

Figure 5:
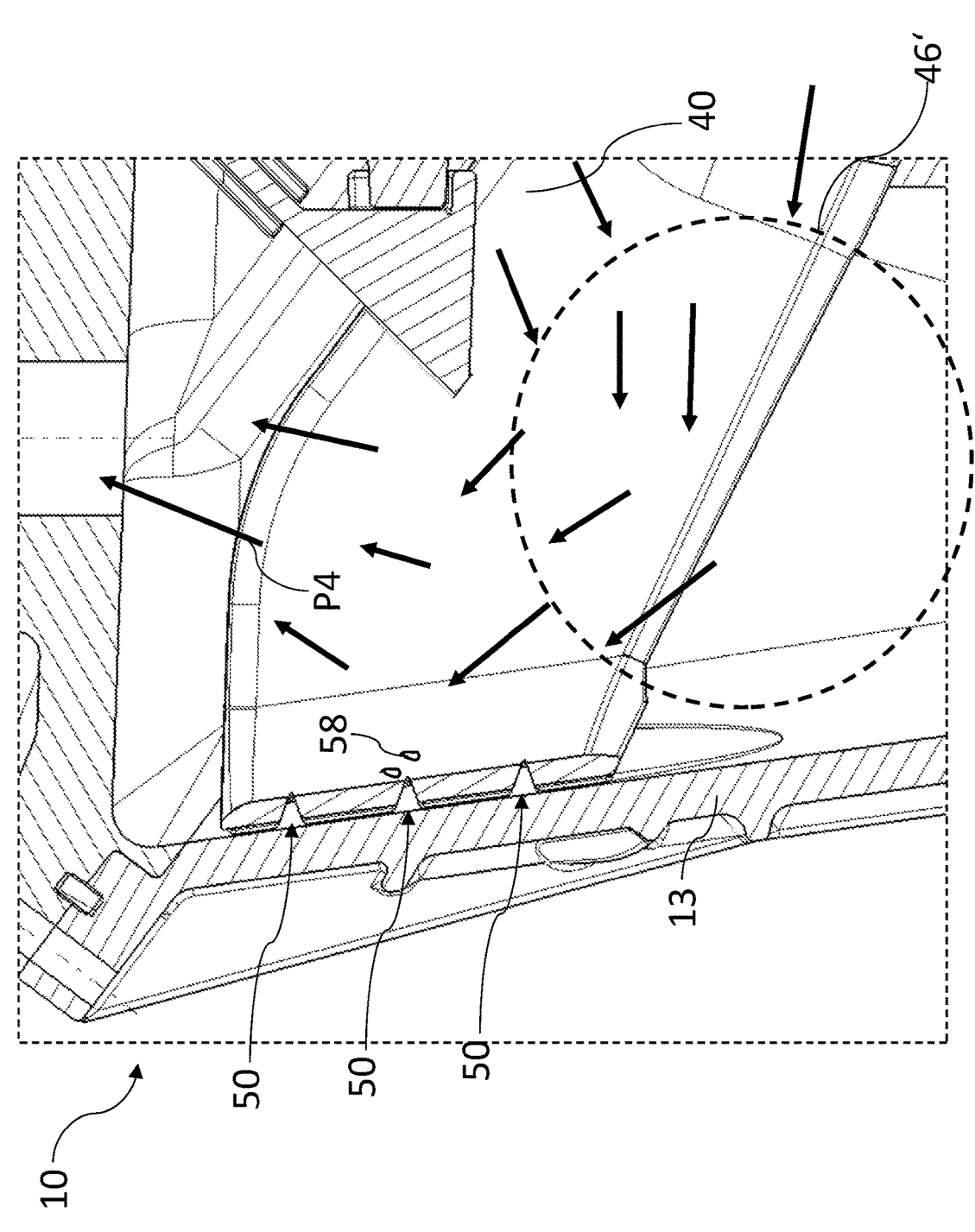
FIG. 5 shows a further enlarged partial detail of the liquid separator from FIG. 2.

On a side 48, facing away from the inlet region 24, of the insert element 40 (opposite side) and optionally on the sides of the insert element 40 which extend to the inlet region 24 from the side facing away from the inlet region 24 (side surfaces), several slots 50 extending along a longitudinal direction of the slot are configured in each case, the cross-section of said slots extending in each case to the wall 13 of the housing 12 (i.e., towards the outside) (cf. FIGS. 2 and 5). The slots 50 can have a V-shaped cross-section, as explained above.

In the example, the insert element 40 extends with a portion into the outlet region 26 of the housing 12 (cf. FIG. 2). The diverting element 22 extends with a portion of its free end into the interior of the insert element 40 (cf. FIG. 2).

The separation device 20 is designed as a fabric separator with two fabric sections 21 for liquid separation in the example. The fabric sections 21 are arranged symmetrically, relative to the central longitudinal axis 30, in the separation device 20, wherein the fabric sections 21 together enclose an angle of 2° to 30° (cf. FIG. 3).

A drainage slot 25 is formed on the separation device 20, which slot connects the interior of the separation device 20 to a chamber, located outside the interior of the separation device 20, in the housing 12 of the liquid separator 10 (cf. FIGS. 3 and 4). In this way, separated liquid, e.g., water drops or a water film, can be discharged from the separation device 20—for example, towards the flow channel 42.

Figure 6B:
FIGS. 6a,b show an embodiment of the liquid separator from FIG. 1 with a fill-level sensor (FIG. 6a) or with a fill-level sensor having a heating element (FIG. 6b)
Figure 6B:
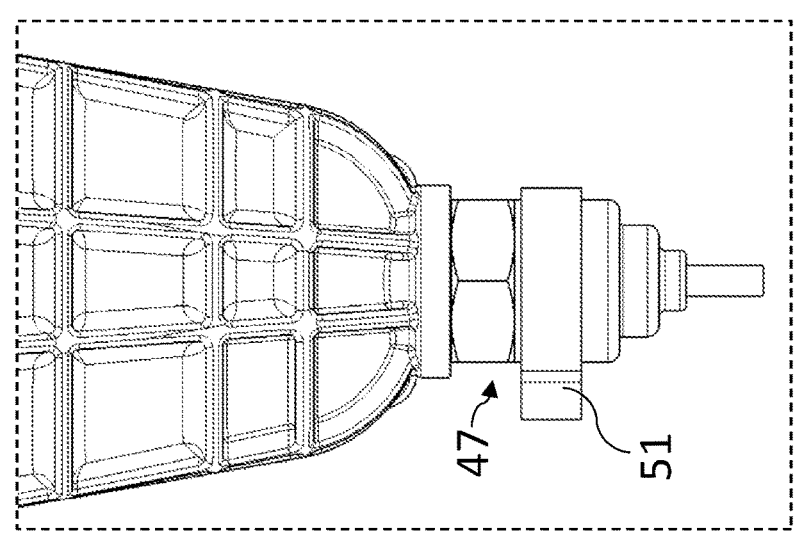
Figure 6A:
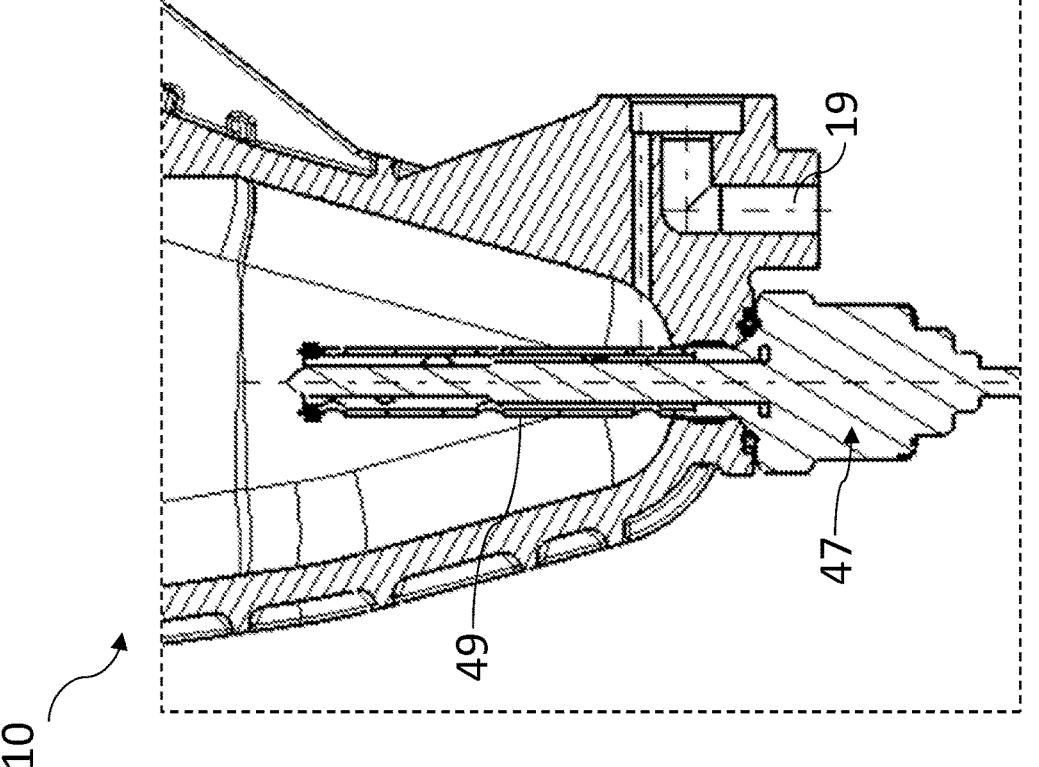

The fill-level sensor 47 mentioned above has, in the example, a perforated metal cap as a protective element 49 (cf. FIGS. 1 and 6a). Optionally, the liquid separator 10 can have an electric heating element 51, by means of which the collecting region 44 or the liquid reservoir 45 can be heated (cf. FIG. 6b). The heating element 51 together with the fill-level sensor 47 can be configured as a unit or assembly. The heating element 51 can be attached to the fill-level sensor 47 such that the collecting region 44 can be heated via the fill-level sensor 47.

Figures 7A, 7B:
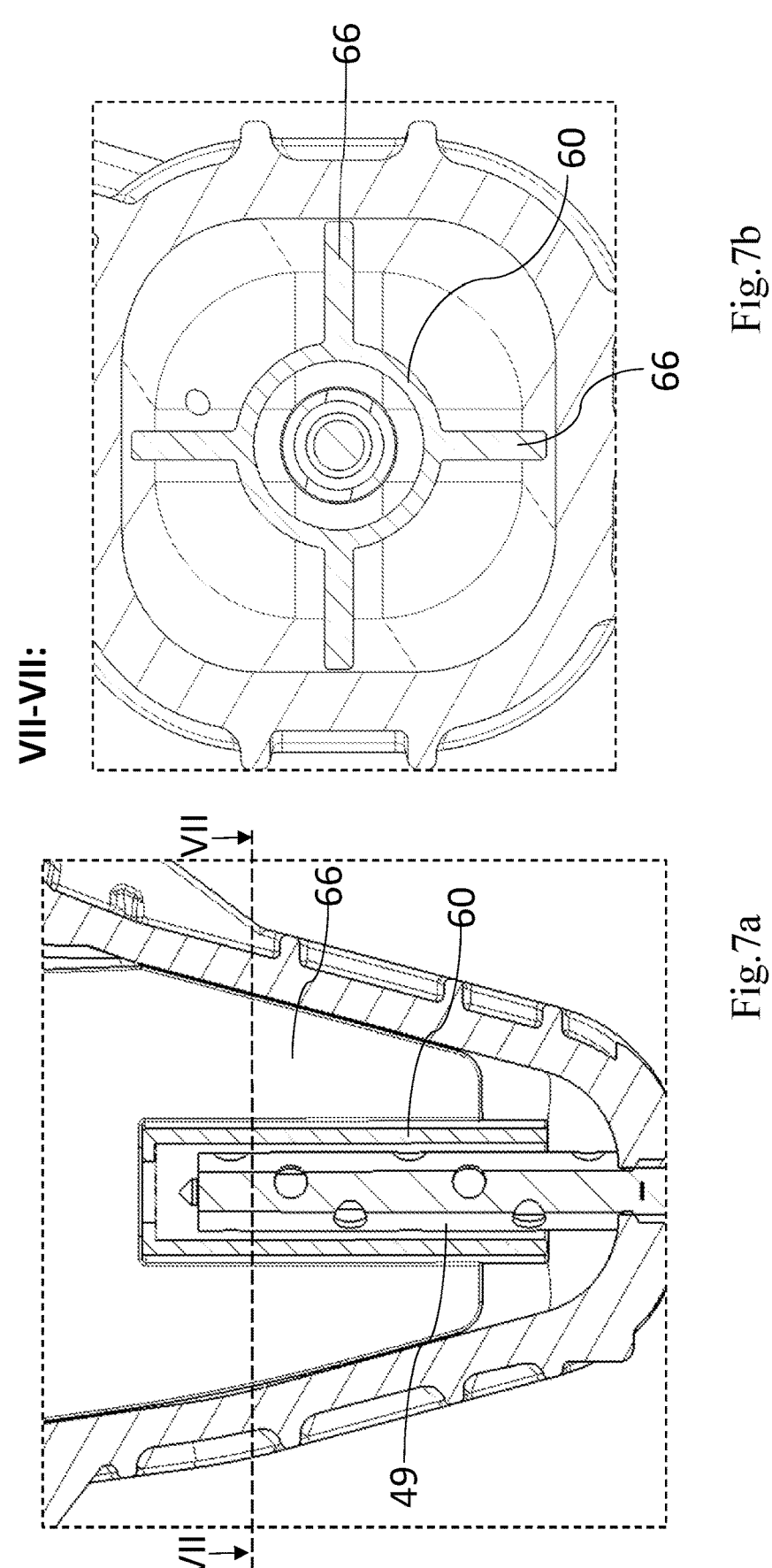
FIGS. 7a,b show an embodiment of the liquid separator from FIG. 1 with a fill-level sensor and surge elements in a longitudinal section (FIG. 7a) and a cross-section according to the intersecting axis VII-VII (FIG. 7b).

Optionally, a cover sleeve 60 can be provided, by means of which the fill-level sensor 47, starting from its free end (facing the low-flow region 46), is covered over its predominant free length (cf. FIGS. 7a and 7b). This increases the accuracy of the fill-level sensor 47, since sloshing movements are reduced.

One or more surge elements 66 can also optionally extend in the collecting region 44 of the housing 12 in each case flatly along one plane. The surge elements 66 can optionally be connected to the cover sleeve 60 (cf. FIGS. 7a and 7b). The surge elements 66 reduce "sloshing movements" of liquid in the housing 12.

The liquid separator 10 operates as follows:

A gas-liquid mixture, from which liquid is to be separated, is fed to the liquid separator 10 via the inlet 14. Liquid which already collects at the inlet 14 or in the separation device 20, e.g., water drops or a water film, can be fed via the drainage slot 25 to the interior, located outside the separation device 20, of the housing 12 (cf. FIGS. 3 and 4). This liquid can flow along the inner side of the wall 13 to the flow channel 42 or the gap 43.

The gas-liquid mixture enters the separation device 20 via the inlet 14. There, the gas-liquid mixture is guided through the fabric sections 21 and diverted thereby, as a result of which the gas-liquid mixture impinges on the inner side of the section 13', surrounding the separation device, of the wall 13 (cf. arrows P1 in FIG. 3; for the sake of clarity, shown only on one fabric section 21). As a result, liquid from the gas-liquid mixture impinges on the inner side of the wall portion 13', which gravity then causes to flow downwards towards the flow channel 42 or gap 43. This liquid passes via the flow channel 42 or the gap 43 and via the low-flow region 46 into the collecting region 44 (cf. FIGS. 1, 3, and 4).

The already partially dehumidified gas-liquid mixture or the partially dehumidified gas flow then flows in the direction of the diverting element 22 (cf. arrows P2 in FIG. 3) and undergoes a diversion through the latter and thus reaches the low-flow region 46. The large volume 46' of the low-flow region 46 reduces the flow rate (cf. FIG. 5). As a result of the reduction in the flow rate, liquid from the gas-liquid mixture is again separated there, e.g., in droplet form, which liquid then enters the collecting region 44 due to gravity (cf. drops 56 in FIG. 2).

In the low-flow region 46, the now further dehumidified gas-liquid mixture or the further dehumidified gas flow is diverted (cf. arrow 18" in FIG. 2 and arrows P3 in FIG. 4) and passes into the outlet region 26, where an outflow takes place via the outlet 16 (cf. FIG. 2 and arrows P4 in FIG. 5). Water drops 58, which impinge on the insert element 40, can pass through the slots 50 and thus reach the flow channel 42 or the gap 43, and can thus flow away towards the collecting region 44.

The invention claimed is:

1. A liquid separator for separating liquid from a gas-liquid mixture, the liquid separator having a housing, an inlet, an outlet, a flow path connecting the inlet to the outlet, and a separation device, arranged in the flow path, for liquid separation, wherein a diverting element is arranged adjacent to the separation device, which diverting element separates an inlet region of the housing, into which the inlet opens, and an outlet region of the housing, out of which the outlet opens, from one another, wherein the flow path extends from the inlet region via a low-flow region into the outlet region, wherein the diverting element redirects the gas-liquid mixture through the low-flow region, thereby lengthening the flow path and reducing a flow rate of the gas-liquid mixture, wherein the liquid separator having a collar-like, self-contained insert element that is arranged in the interior of the housing and projects into the inlet region and, together with a wall of the housing, defines a first flow channel which connects the inlet region to the low-flow region arranged above a collecting region, so that liquid collected in the inlet region can flow through the first flow channel into the collecting region, wherein the first flow channel is designed as a circumferential gap between the insert element and the wall of the housing, and wherein several ribs for distancing the insert element from the wall are configured on outer sides of the insert element, wherein the insert element defines a second flow channel which connects the inlet region and the outlet region.

2. The liquid separator according to claim 1, wherein the diverting element extends flatly and has a central longitudinal plane, wherein the separation device has a central longitudinal axis, and wherein the central longitudinal axis of the separation device and the central longitudinal plane of the diverting element intersect at an angle of less than 90°.

3. The liquid separator according to claim 1, wherein the diverting element is fastened to the housing via a mechanical plug connection.

4. The liquid separator according to claim 1, wherein the separation device has, at its end facing away from the inlet, a fastening portion, wherein the diverting element has a holding portion which corresponds to and holds the fastening portion.

5. The liquid separator according to claim 1, wherein several slots extending along a longitudinal direction of the slot are each configured on a side, facing away from the inlet region, of the insert element and/or on the sides of the insert element which extend to the inlet region from the side facing away from the inlet region, the cross-section of said slots extending in each case to the wall of the housing.

6. The liquid separator according to claim 1, wherein the insert element extends with a portion into the outlet region of the housing and/or that the diverting element extends with a portion of its free end into the interior of the insert element.

7. The liquid separator according to claim 1, wherein the separation device is designed as a fabric separator having at least one fabric section for liquid separation.

8. The liquid separator according to claim 7, wherein the separation device has two fabric sections which are arranged symmetrically, relative to the central longitudinal axis, in the separation device, wherein the fabric sections together enclose an angle of 2° to 30°.

9. The liquid separator according to claim 1, wherein a liquid reservoir and/or a fill-level sensor is arranged in the collecting region of the housing.

10. The liquid separator according to claim 9, wherein a cover sleeve is provided, by means of which the fill-level sensor, starting from its free end over its predominant free length, is covered.

11. The liquid separator according to claim 1, wherein one or more surge elements extend in the collecting region of the housing.

* * * * *